April 4, 1944.  R. A. FORESMAN  2,346,068
MATERIAL HANDLING APPARATUS
Filed Dec. 10, 1941  2 Sheets-Sheet 1

WITNESSES:

INVENTOR
ROBERT A. FORESMAN.
BY
ATTORNEY

April 4, 1944.    R. A. FORESMAN    2,346,068
MATERIAL HANDLING APPARATUS
Filed Dec. 10, 1941    2 Sheets-Sheet 2
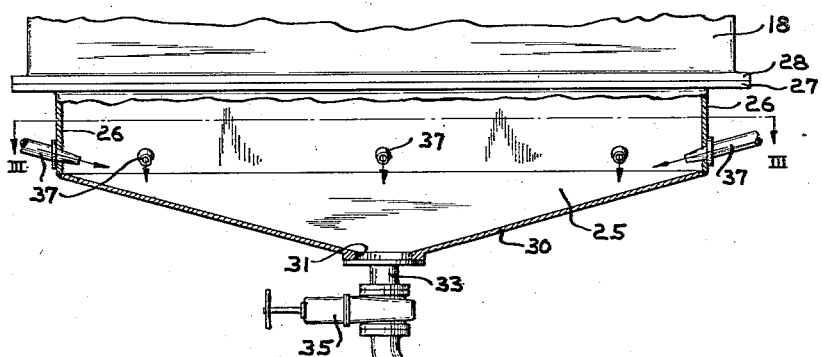
Fig. 2.
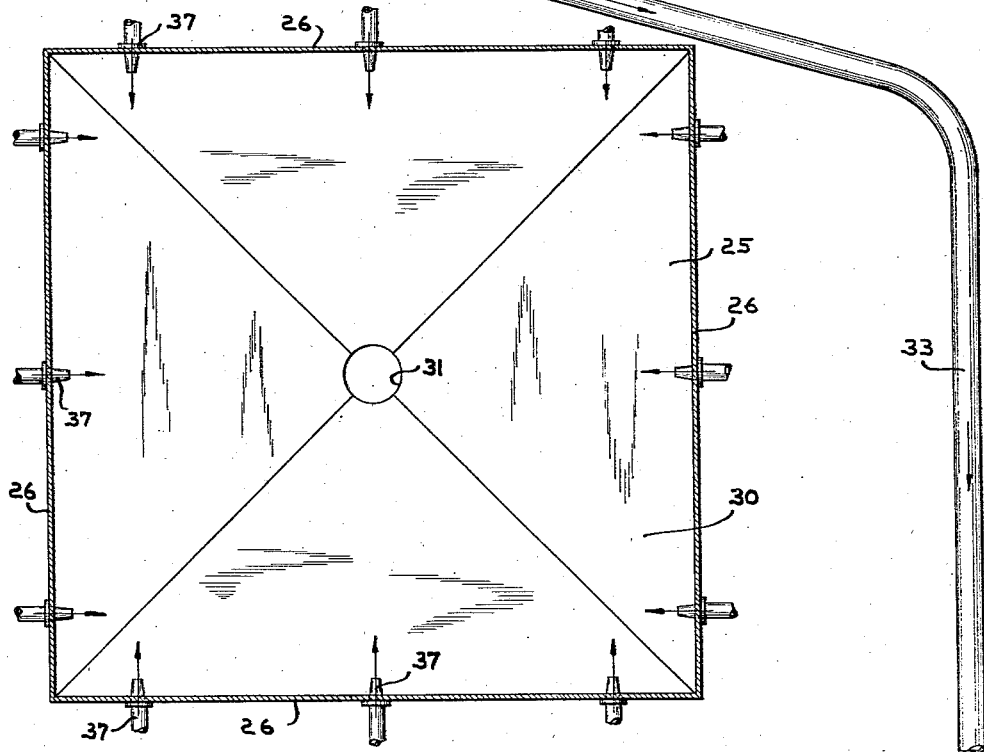
Fig. 3.
WITNESSES:
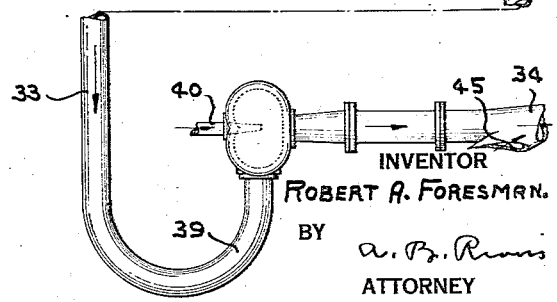
INVENTOR
ROBERT A. FORESMAN.
BY
ATTORNEY Patented Apr. 4, 1944

2,346,068

UNITED STATES PATENT OFFICE 2,346,068

MATERIAL-HANDLING APPARATUS

Robert A. Foresman, Prospect Park, Pa., assignor to Westinghouse Electric & Manufacturing Company, East Pittsburgh, Pa., a corporation of Pennsylvania Application December 10, 1941, Serial No. 422,415

2 Claims. (Cl. 110—165)

The present invention relates to material-handling apparatus, more particularly to hydraulic conveyors for the solid products of combustion from furnaces, and it has for an object the provision of improved apparatus of this character.

With pulverized fuel fired furnaces, the disposition of the fly ash removed from the flue gases constitutes a major problem. In large central station installations the amount of fly ash removed from the furnace gases during a twenty-four hour period may equal 200 tons, or more.

This problem is particularly difficult with that type of pulverized fuel fired combustion apparatus where the mechanism for removing the fly ash from the flue gases is located above the boiler. In many installations, the boiler is 75 feet or more in height and the fly ash precipitator or separator is frequently located above the top of the boiler. In such cases, the space between the precipitator and the top of the boiler available for ash removal mechanism is very limited, as any increase in the height of this space necessitates a corresponding increase in the height of the power plant, and at such heights any such increase would be relatively very expensive.

Heretofore, it has been believed that fly ash could not be removed and transported from this location successfully by hydraulic means, and as a result, in actual practice, fly ash has been collected dry and transported in that state to a hopper outside of the plant. Generally, pneumatic means have been relied upon in such removal of fly ash from the separator to the externally-located hopper. The use of pneumatic conveying means in such installations produces an undesired result in that there is generally considerable leakage of air from the conveying system to the separator, thereby reducing the efficacy of the induced draft fan tending to create a vacuum or sub-atmospheric pressure in the separator and connecting ducts.

The present invention contemplates the elimination of these and other difficulties by the provision of novel hydraulic material-transporting mechanism. Therefore, another object of the invention is to provide a closed hydraulic material-conveying system.

A further object of the invention is to provide a closed and sealed hydraulic system for conveying fly ash from a point, in the flow path of gases through combustion apparatus, where the pressure is below atmospheric to a place of discharge which is at atmospheric pressure.

These and other objects are effected by the invention as will be apparent from the following description and claims taken in connection with the accompanying drawings, forming a part of this application, in which:

Fig. 2 is an enlarged detail view of a portion of the apparatus shown in Fig. 1; and Fig. 3 is a sectional view taken along the line III—III of Fig. 2, looking in the direction of the arrows.

Figure 1:
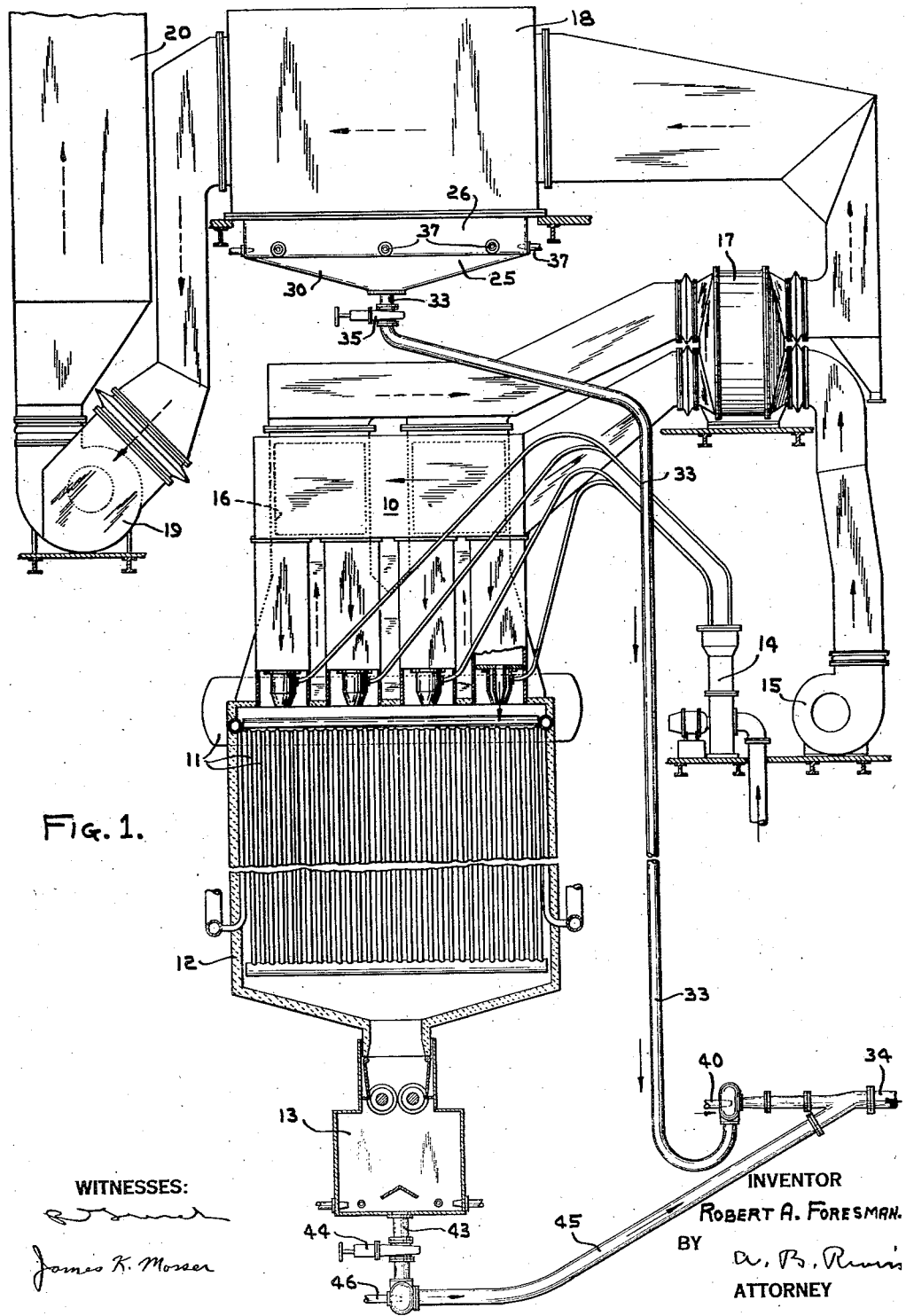
Fig. 1 is a side elevational view of combustion apparatus, with portions thereof broken away for the sake of clearness.

Referring now to the drawings more in detail, there is shown at 10, in Fig. 1, a combustion apparatus installation which may be considered conventional insofar as the boiler 11, furnace 12, slag pit 13, pulverized fuel feeding mechanism 14, forced draft fan 15, economizer 16, preheater 17, precipitator 18, induced draft fan 19, and stack 20 are concerned.

There is provided, in the limited space between the top of the boiler and the precipitator or separator 18, a fly ash collection hopper 25 comprised by side walls 26 having at their upper edges flanges 27 adapted to be connected in gas-tight relation to corresponding flanges 28 at the lower edge of the separator 18. The hopper is closed at its under side by a downwardly-inclined bottom wall 30 having a discharge opening 31 at its lowest point. A discharge conduit 33 is connected to the bottom of the hopper in alignment with the outlet opening 31 and provides for communication between the interior of the hopper 25 and a main refuse discharge line 34, the latter generally being located at a level considerably below the boiler, and preferably near or below the floor of the plant. Passage of material through the conduit 33 is controlled by a valve 35, preferably located near the outlet opening 31 of the hopper.

A plurality of nozzles 37 are disposed about the upper edge of the inclined bottom 30 and are so positioned as to direct streams of fluid (preferably water) over the inner surfaces of the bottom walls 30 toward the outlet opening 31.

It will be apparent that this arrangement provides for either intermittent or continuous discharge of fly ash and water from the hopper. If the operation is to be continuous, the nozzles 37 will be supplied with water at all times, thereby maintaining a continuous moving film of water over the bottom walls 30 of the hopper, with the result that the fly ash falling into the hopper from the separator 18 thereabove will be carried through the outlet opening 31 and the conduit 33 to the main discharge line 34. With intermittent operation, the valve 35 will normally be closed and the nozzles 37 will supply sufficient water to the hopper to substantially fill the latter, after which the supply will be cut off. At desired intervals, when the hopper has become filled with a mixture of water and fly ash, the valve 35 will be opened and additional water admitted through the nozzles 37 to agitate and maintain a fluent mixture of fly ash and water. This mixture will be flushed through the outlet opening 31 and along the conduit 33 to the main refuse discharge line 34.

Inasmuch as the induced draft fan 19 normally maintains a sub-atmospheric pressure in the separator 18, it is desirable to prevent leakage of air or gases through the conduit 33 and hopper 25 to the separator 18 and, to this end, there is formed in the conduit 33 a U bend, as at 39, providing a water seal which prevents passage of gases therepast.

While in the construction herein illustrated the hopper 25 is joined to the separator 18 by meeting flanges providing a gas-tight connection, the two parts may be structurally independent, and leakage of gas therebetween prevented by use of a conventional water seal wherein a depending skirt on the separator extends below the surface of water maintained in a groove or channel at the upper edge of the hopper.

Under certain conditions, as for example, where the main discharge line 34 is of considerable length, it may be desirable to provide additional means to urge the mixture of fly ash and water therealong. In the modification herein illustrated, there is shown for this purpose an ejector 40 located in the conduit 33 adjacent its point of connection with the main discharge line 34.

One important advantage of the hydraulic fly ash conveying system just described above is that it may be conveniently connected in with a corresponding hydraulic system for removing the heavier ash and clinkers from the slag pit 13. As shown in Fig. 1, the slag pit 13 may be provided with a discharge conduit 43 controlled by a valve 44, the conduit 43 connecting, through a conduit 45, with the main discharge line 34. Suitable means, such as the ejector 46, may be provided for aiding the flow of ash and water along the conduit 45. It is believed that the advantages of a single hydraulic system for transporting the refuse from both ends of the combustion apparatus will be obvious to those skilled in the art.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Apparatus of the character described comprising a furnace; a separator for removing fly ash from the furnace gases; a hopper positioned beneath the separator and adapted to receive the fly ash therefrom; means providing an air-tight seal between the hopper and separator, said hopper having a discharge opening adjacent its lowest portion; a plurality of nozzles disposed adjacent the periphery of the hopper bottom and adapted to direct jets of water along the hopper bottom towards the discharge opening; a main ash and refuse discharge pipe located at a materially lower level than the hopper; a closed conduit extending from the discharge opening to said main discharge pipe for gravitational discharge of fly ash and water from the hopper; and a water seal for the conduit.

2. Combustion apparatus including a furnace; a separator for removing solid products of combustion from the furnace gases; a main refuse disposal conduit, a pit beneath the furnace for reception of refuse from the latter; a first discharge conduit from the pit to the main disposal conduit; means including an ejector for assisting discharge of refuse from said pit and movement thereof along said main refuse conduit; a hopper positioned beneath the separator to receive refuse therefrom and having a discharge opening adjacent its lowest portion; means for supplying water to the hopper to provide with the refuse a fluent mixture; a second discharge conduit extending from the hopper discharge opening to the main disposal conduit; and means including an ejector for assisting discharge of refuse from the hopper to and along the main conduit, said second discharge conduit including a portion in the form of a U-bend providing a liquid seal against reverse flow of air through said conduit to the separator.

ROBERT A. FORESMAN.